Patented May 29, 1928.

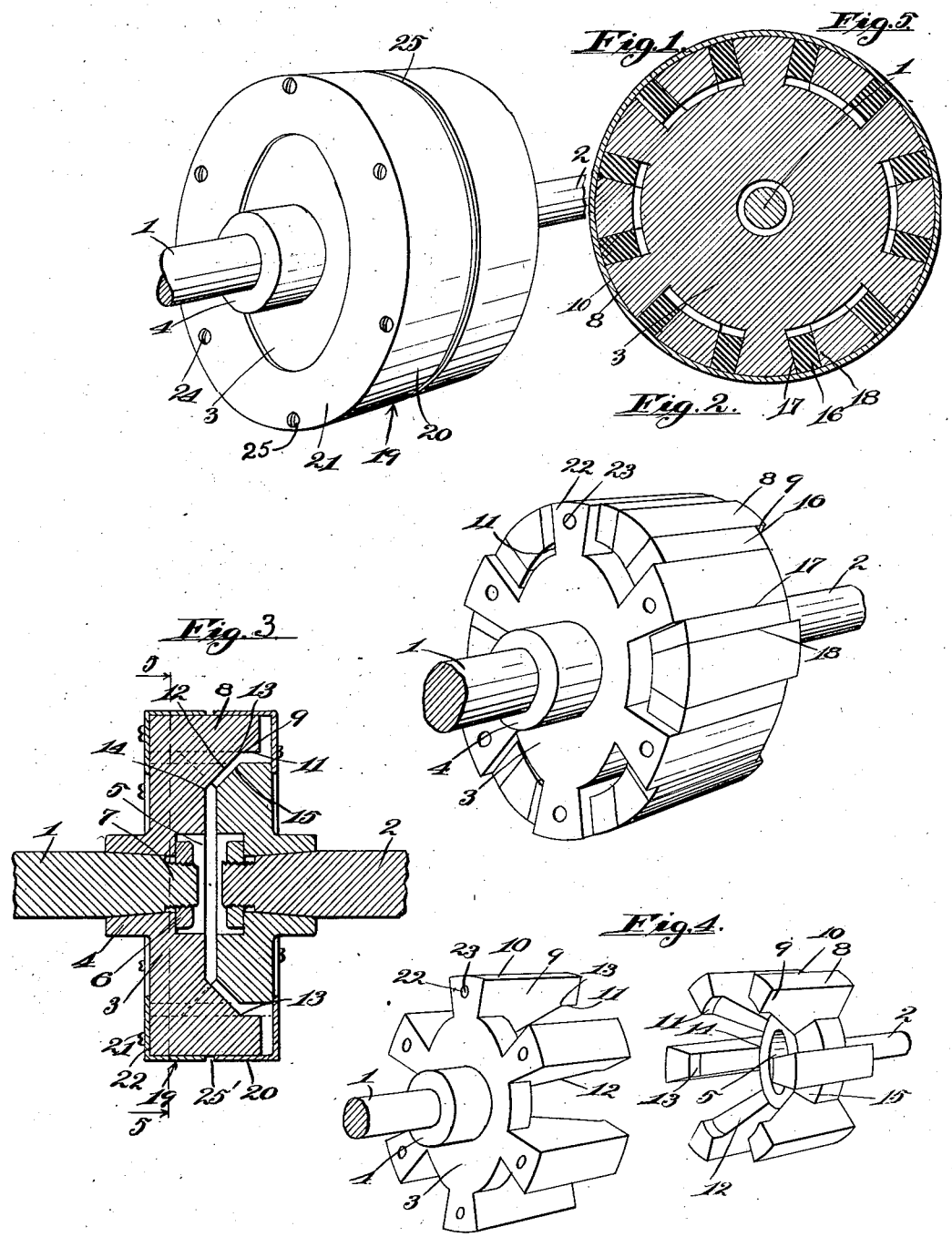

1,671,436

UNITED STATES PATENT OFFICE.

JOHN M. MELOTT, OF LOS ANGELES, CALIFORNIA.

FLEXIBLE COUPLING.

Application filed November 10, 1926. Serial No. 147,488.

My invention is a flexible coupling for shafts, to accommodate shafts which are slightly out of axial alinement.

An object of my invention is the construction of a flexible coupling formed of a pair of substantially similar elements to be attached to the abutting ends of shafts, such elements having heavy interlocking circumferential splines with a resilient packing such as rubber between. The splines interfit one with the other and have the rubber between the splines.

My invention is illustrated in the accompanying drawings, in which;

Figure 1 is a perspective view of my coupling with the casing attached thereto;

Fig. 2 is a perspective view of the coupling with the casing removed;

Fig. 3 is a longitudinal section of the coupling;

Fig. 4 is a perspective view of the elements of the coupling drawn apart.

Fig. 5 is a transverse section on the line 5—5 of Fig. 3 showing in particular the relation of the splines and the resilient packing.

The shafts are designated by the numerals 1 and 2, these being shown as tapered, but the taper is immaterial so far as the use of my coupling is concerned. Each coupling element has a hub section 3 with an extension 4 extending along the shaft. The hubs have a counter-bore 5 whereby a nut 6 may thread on the threaded end 7 of the shafts and thereby secure the hubs and the coupling elements securely to the shafts. A plurality of splines 8 extend radially outwardly from the hub, these having inclined faces 9 on opposite sides and being formed preferably with cylindrical outer surfaces 10 and cylindrical inner surfaces 11.

Angular webs 12 function to brace the splines between the outer end of same and the hub. These webs join the spline proper as indicated at 13 and the hub proper as indicated at 14. The hubs have a cut-out portion 15 between the splines to accommodate the webs fitting over same when the coupling elements are connected.

A series of resilient packing strips 16 preferably formed of pure gum rubber are fitted between the splines. These strips are formed with parallel sides 17 and 18 to abut against the side faces of the splies. A pair of casings 19 having a cylindrical portion 20 and a radial portion 21 are secured to the base 22 of the splines, there being screw threaded sockets 23 and apertures 24 in the end 21 of the casings, whereby screws 25 hold the casings in place. There is a slight space 25' between the end edges of the adjacent casings to prevent same from touching when the coupling gives due to having its elements connected to shafts which are out of alinement either axially or angularly.

In actual construction there is a slight clearance between the cylindrical portion 20 of the casings 19 and the outer surfaces 10 of the splines accommodating a slight angular position of the shafts and hence of the hubs and splines. However, in case the splines bear against the cylindrical portions 20 they will only bell these outwardly, which is more or less immaterial.

The manner of functioning of my flexible coupling is substantially as follows:

It will be seen that the two elements having the hubs and the splines may be rigidly secured to the ends of abutting shafts. The splines on one hub interfit the splines on the other hub and the rubber packing takes the thrust between the interengaging splines. As these splines have a working motion due to the rotation of the shafts which are out of alinement the rubber is slightly distorted, but there is no tendency to push the rubber radially by the splines as the splines and rubber packing have bearing faces in planes perpendicular to the direction of rotation. Hence my flexible coupling accommodates itself to transmission of a considerable amount of power at high speed and also accommodates shafts which are out of alinement in an axial direction or angularly.

It will be noted in my construction of flexible coupling that I provide heavy and substantial hubs which are secured to the shafts and that the splines extend from the outer faces of the hubs beyond the inner face so that when the two coupling elements are assembled the splines of one coupling overlap the other coupling to a considerable extent. Also in order to give greater strength to the splines the hub of one section is cut away, as shown on the line 15, and the other hub at the spline has a web filling in 12. Another characteristic feature of my invention is that the resilient packing strips, preferably formed of rubber, are solid and have their opposite faces parallel. In the transmission of rotary movement the splines on one of the coupling elements will bear against the resilient packing and the contiguous surfaces of the driving splines and the packing strips are at right angles to the direction of rotation. The relative angle of the surface of the driven splines on the driven hub are made such as to accommodate the parallel sided packings. Therefore in the operation of my coupling there is no tendency of the packing strips to be forced outwardly by a wedging action. In fact, if anything, the action of the splines on the packings tends to draw these inwardly.

While I have illustrated my invention as having a certain number of splines, it is to be understood that the number may be changed either by using a lesser number of splines or a greater number and that other types of resilient packings may be used between the splines.

Various changes may be made in the principles of my invention without departing from the spirit thereof as set forth in the description, drawings and claims.

What I claim is:

1. A flexible coupling comprising in combination a pair of hubs, each hub having a plurality of splines extending outwardly, the splines extending from the outer beyond the inner face of each hub, the splines on each hub interfitting and overlapping each other, each of the hubs having a cut away part between the splines on such hub, and the opposite hub having webs connecting hubs and the splines at the cut away part of the opposite hub, a solid, separate, resilient packing strip between each spline, each strip having parallel opposite faces, and the splines being shaped to bear against said parallel faces.

2. A flexible coupling having a pair of hubs, each of the hubs having splines extending from their outer face beyond their inner face, such splines interfitting and overlapping, a plurality of separate, solid, resilient packing strips between the splines, there being one strip between each spline and each strip having its opposite faces engaging the splines parallel, the driven splines being shaped to accommodate the opposite parallel side of each packing strip, and a casing secured on each of the hubs, said casings having an outer peripheral part extending over the splines and over the packing between the splines, the casings on opposite hubs being separated by a slight peripheral space.

3. A flexible coupling comprising in combination a pair of hubs adapted to be secured to shafts, each hub having a series of longitudinal splines extending outwardly from the hub, said splines in length extending from the outside face of each hub beyond the inside face of the same hub, the splines interfitting in relation to each other and overlapping, the spline on one hub extending substantially the full length of the spline on the opposite hub, a plurality of separate solid resilient packing strips, there being a strip between each pair of splines, the bearing surfaces of each packing strip being parallel and the center line of each packing strip being substantially radial in relation to the axis of the hub.

4. A flexible coupling comprising in combination a pair of hubs, each hub having a plurality of splines extending longitudinally from the outer face and beyond the inner face of each hub, the splines on the hubs interfitting and overlapping, a plurality of separate solid resilient packing strips between the splines, the bearing surfaces of the packing strips of the splines being parallel and the center line of the packing strips being substantially radial, as regards each hub.

In testimony whereof I have signed my name to this specification.

JOHN M. MELOTT.